Dec. 10, 1957  E. G. BOEHM ET AL  2,815,829
SHOCK ABSORBERS WITH COMPRESSIBLE CUSHIONS
Original Filed March 9, 1951
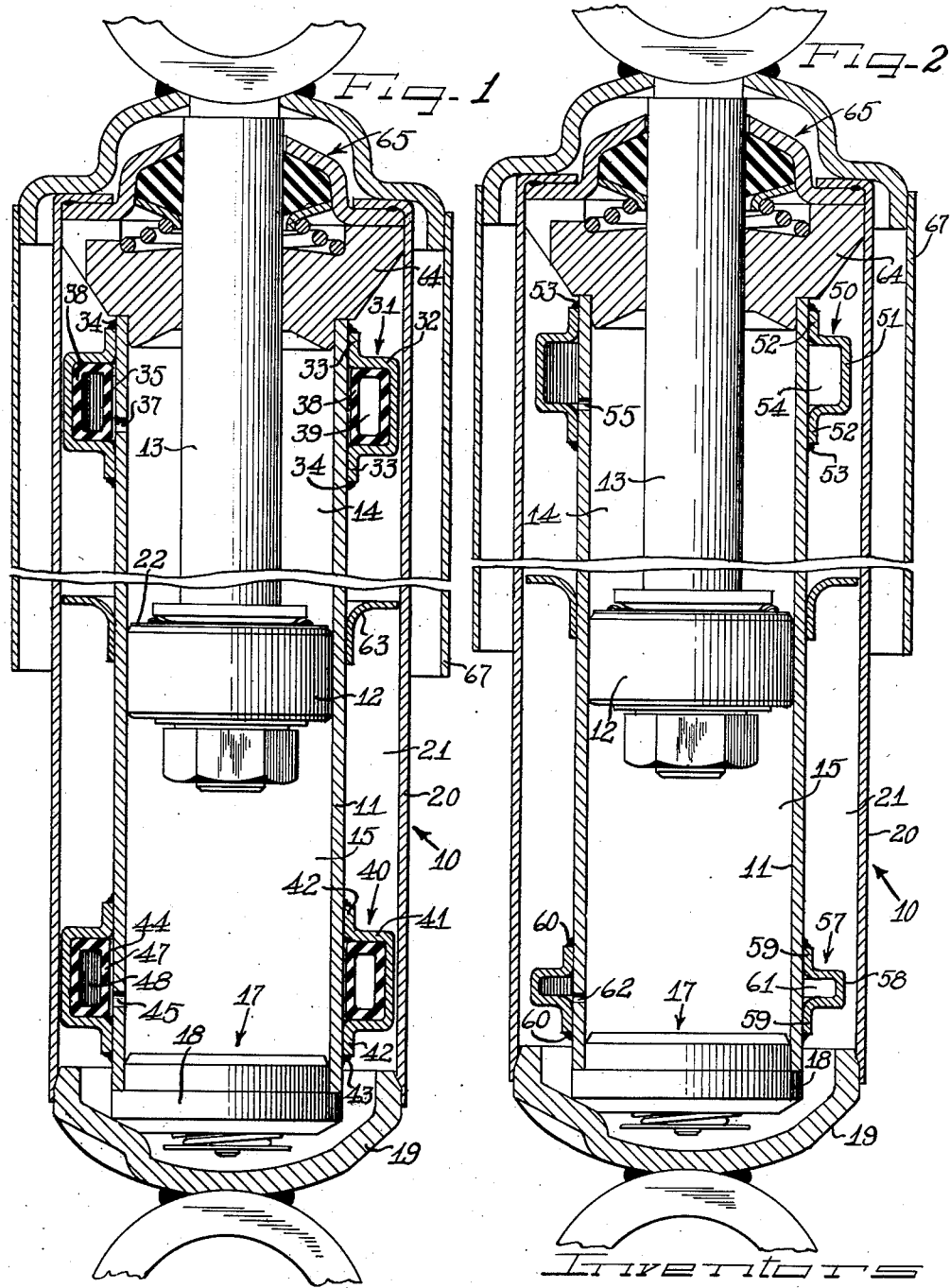
Inventors
Eric G. Boehm
Carl F. Lautz

United States Patent Office 2,815,829
Patented Dec. 10, 1957

2,815,829

SHOCK ABSORBERS WITH COMPRESSIBLE CUSHIONS

Eric G. Boehm, Birmingham, Mich., and Carl F. Lautz, Buffalo, N. Y., assignors to Houdaille Industries, Inc., a corporation of Michigan Original application March 9, 1951, Serial No. 214,782, now Patent No. 2,781,869, dated February 19, 1957. Divided and this application March 9, 1955, Serial No. 493,315

7 Claims. (Cl. 188—88)

The present invention relates to improvement in telescopic shock absorbers and more particularly concerns improvements in such shock absorbers affording smoother operation.

The present invention is a division of our copending application Serial No. 214,782, filed March 9, 1951, and now Patent No. 2,781,869.

One of the principal reasons for using hydraulic fluid in direct acting shock absorbers is to take advantage of the incompressibility of the hydraulic fluid. Thereby greater resistance to relative movement of the cylinder and piston portions of the shock absorbers is attained by the proper metering of the hydraulic fluid in displacement of the fluid from chamber to chamber in the shock absorber unit than where a gas or air is used in the shock absorber, with the high compressibility ratio of the gaseous fluid and generation of heat of compression. However, due to the incompressibility of the hydraulic fluid, at least the initial resistance to relative movement of the piston and cylinder responsive to high magnitude or frequency shocks is such as to cause some jarring resistance. This lack of smoothness in operation under severe shock conditions is especially noticeable in passenger vehicles.

An important object of the present invention is to overcome the rough riding characteristics of hydraulic direct acting shock absorbers by the provision of pneumatic cushioning means therein.

Another object of the invention is to provide pneumatic cushioning means in direct acting hydraulic shock absorbers in such a manner as to adapt the hydraulic cushioning means to existing forms of the shock absorbers and avoid the necessity of any substantial re-designing of the shock absorber components.

A further object of the invention is to provide auxiliary cushioning means in direct acting hydraulic shock absorbers adapted to be supplied as optional equipment in such shock absorbers. Still another object of the invention is to provide in direct acting hydraulic shock absorbers small volume gaseous pockets or cells to afford compressible cushions.

Other objects, features and advantages of the present invention will be readily apparent from the following detailed description of certain preferred embodiments thereof taken in conjunction with the accompanying sheet of drawings, in which:

Figure 1 is a fragmental vertical diametrical sectional view through a hydraulic shock absorber illustrating one embodiment of the instant invention; and Figure 2 is a fragmental diametrical vertical sectional view taken through a modified shock absorber structure embodying the invention.

By way of illustration the instant invention is shown as embodied in a direct acting or telescopic shock absorber 10 (Figure 1) which comprises, as its component parts, a cylinder 11 having reciprocably operable therein a piston 12 carried by the lower end portion of a piston rod 13 and dividing the interior of the cylinder into upper and lower pressure chambers 14 and 15, respectively. At its lower end the cylinder is associated with a foot valve structure 17 including a cage member 18 with which the lower end of the cylinder is concentrically assembled and which in turn is maintained in assembly by the cylinder with a lower closure cap member 19 assembled with a reservoir tube or casing 20 of larger diameter and disposed concentrically about the cylinder 11 and affording a reservoir chamber 21 between the cylinder and the reservoir casing.

During what is known as the compression stroke of the piston 12, that is, when the piston travels downwardly in the cylinder 11 as viewed in Figure 1, fluid is displaced under resistance of a spring loaded valve 22 through a series of axially extending ports (not shown) from the lower chamber 15 of the shock absorber into the upper chamber 14, and fluid that is displaced by the volume of the piston rod 13 in the chamber 14 escapes under resistance through the foot valve assembly 17 into the reservoir chamber 21. On the rebound stroke of the piston 12, that is when the piston travels upwardly in the cylinder 11, fluid is displaced from the upper chamber 14 into the lower chamber 15 through a plurality of axial ports (not shown) in the piston under the resistance of a blow-off resisting spring, and the fluid which was displaced from the chamber 15 due to the volumetric displacement of the piston rod 13 returns into the chamber 15 from the reservoir chamber 21.

In order to provide for cushioning of the shock absorber by affording a certain or predetermined amount of "free travel" of the piston during at least the compression stroke thereof and preferably also during the rebound stroke, an air pocket or cell is provided in association with the upper chamber 14.

In the embodiment shown in Figure 1 this air pocket or cell for cushioning of the shock absorber comprises a ring-like air cell structure 31 including a generally channel-shaped annulus 32 opening inwardly and having oppositely extending generally axial annular flanges 33 of a diameter to engage the outer wall surface of the cylinder 11 and secured thereto as by means of brazing or welding 34. This provides an air cell space 35 encircling the upper end portion of the cylinder 11 and communicating with the cylinder chamber 14 through a port 37. Thereby hydraulic fluid displaced from the chamber 14 into the air cell chamber 35 through the port 37 will cause compression of air in the air cell space 35.

In order to avoid possible displacement of air from the air cell space 35 into the cylinder chamber 14, the air or other gas within the air cell space is trapped within a sealed collapsible and preferably resilient wall tubular cell member 38 which preferably substantially fills the chamber 35. The interior of the tubular cell member 38 provides a hollow gas filled chamber 39.

Upon the development of pressure in the chamber 14, hydraulic fluid displaced through the port 37 into the air cell chamber 35 causes the flexible, resilient air cell 38 to collapse and compress the air or gas in the cell chamber 39, thus affording a certain amount of free travel of the piston 12 and cushioning of the action of the shock absorber during both compression and rebound strokes. The size of the port 37 will determine the extent of metering of the hydraulic fluid displaced into the chamber 35 and then displaced from the chamber 35 back into the chamber 14 by expansion of the air cell member 38 into re-occupying of the space in the chamber 35 upon relief of the shock absorbing pressure within the shock absorber.

Either alternatively to the air cell structure 31 or supplementary thereto, an air cell structure 40 of similar general construction may be provided for the lower end portion of the cylinder 11 and communicating with the lower hydraulic chamber 15 of the shock absorber. To this end, the air cell structure 40 comprises an annular generally inwardly opening channel-shaped body 41 having generally axially oppositely extending flanges 42 which are secured as by welding or brazing 43 to the external surface wall of the cylinder 11 adjacent to the bottom thereof and providing an air cell chamber 44 therein which is sealed from the reservoir chamber 21 but has communication with the cylinder chamber 15 through a metering port 45. It will be observed that both the air cell chamber casings 32 and 41 are of smaller diameter than the internal diameter of the reservoir casing tube 20 so as to permit hydraulic fluid to be displaced thereby in the reservoir chamber.

For trapping the air or gas in the air cell chamber 44 to avoid displacement thereof into the cylinder, a tubular resilient, collapsible annular cell member 47 is provided which substantially fills the chamber 44 and provides an air or gas chamber 48. During a compression stroke of the piston 12 hydraulic fluid is displaced through the port 45 into the air cell chamber 44 and collapses the air cell member 47 and compresses the gas in the chamber 48, thereby providing a cushion and certain amount of free travel of the piston 12 during the compression stroke.

In the form of Figure 2, a direct acting or telescopic shock absorber 10 is shown in which the basic features of the shock absorber are substantially the same as in the form of Figure 1 and similar reference numerals have been applied to indicate similar parts. In this form of the invention, however, cushioning air cell structures are provided wherein air isolating casings or tubes are omitted. To this end, an air cell structure 50 may be provided for the upper chamber 14 of the shock absorber and comprises an annular inwardly opening channel-shaped substantially rigid casing ring 51 having opposite axially extending attachment flanges 52 which are secured as by means of welding or brazing 53 to the outer surface of the cylinder 11 to provide a sealed air chamber 54 encircling the cylinder at the upper end of the chamber 14. Communication with the chamber 14 is effected from the air cell chamber 54 through a port 55 which is located at the lowermost portion of the chamber 54.

Through this arrangement, upon the development of pressure within the chamber 14, hydraulic fluid displaced through the port 55 into the air chamber 54 causes air in the chamber 54 to be compressed into the upper portion of the chamber 54. Upon release of the pressure the air expands and expels the hydraulic fluid from the chamber 54 through the port 55. The size of the port 55 will determine the extent of metering of the hydraulic fluid and thus supplements the cushioning resistance and smoothness of the action of the shock absorber in service. The size of the air cell chamber 54 will determine the extent of the free travel of the piston 12 during a compression or rebound stroke.

Alternatively to or supplementary to the air cell 50, there may be provided an air cell structure 57 in association with the lower pressure chamber 15 of the shock absorber. For this purpose an annular, substantially rigid, and preferably sheet metal ring casing 58 of generally channel shape with the channel opening inwardly is provided encircling the cylinder 11, preferably adjacent to its lower end and thus at the lower end of the chamber 15. The air cell casing ring 58 is secured to the cylinder 11 by means of axially oppositely extending marginal flanges 59 which are secured to the outer surface of the cylinder as by means of brazing or welding 60 to provide a fluid-tight seal.

Communication between the chamber 15 and an air cell space or chamber 61 within the cell casing 58 is provided for by a port 62 at the lower portion of the chamber 61. As a result, upon the development of compression stroke pressure within the chamber 15, hydraulic fluid will be displaced through the port 62 and into the air cell chamber 61 and effect compression of air in the air cell space and afford a free travel, cushioning in operation of the shock absorber.

It will be observed that the air cell 57 is shown as of substantially smaller volume than the upper cell 50. For supplementary purposes, this is satisfactory since both the air cell 50 and the air cell 57 are operative for cushioning purposes during a compression stroke. Where the lower or compression stroke effective air cell 57 alone is used, it may be desired to have the same of larger size, but that is a matter of choice to be determined by the operating characteristics desired for any particular service conditions that must be met by the shock absorber. It may also be noted that the size of the port 62 is smaller than the port 55 so that a greater pressure drop in the metering of the hydraulic fluid through the port 62 is afforded.

Where, as shown in the drawings, the shock absorber is provided with a surge baffle ring 63, it is desirable to mount the baffle ring on the cylinder 11 rather than on the inside of the reservoir casing tube 20 as is the usual practice. This facilitates assembly of the shock absorber components.

The shock absorber also includes the usual top structure including a top closure disk 64 providing a bearing for the piston rod 13, as well as a packing gland structure 65 through which the piston rod 13 is operable above the closure disk 64. A gravel guard 67 may also be provided.

The term "air" where used herein should be construed to mean any gaseous medium, although it will be evident that in the structures disclosed herein air as such will be the usual and economically available gaseous medium for the air cell chambers.

It will be understood that modifications and variations may be effected without departing from the scope of the novel concepts of the present invention.

We claim as our invention:

1. In a direct acting shock absorber assembly including a cylinder having a piston operable therein and a reservoir tube encircling the cylinder and affording therewith a reservoir chamber, an air cell cushioning structure in the reservoir chamber and communicating with the interior of the cylinder but non-communicating with the reservoir chamber.

2. In combination in a hydraulic shock absorber comprising a cylinder, a piston operable in the cylinder, the piston having a piston rod extending through one portion of the cylinder, means providing a reservoir chamber in communication with said cylinder, hydraulic fluid substantially filling the cylinder, and a cushioning air cell structure concentrically encircling the piston rod and subjected to hydraulic fluid upon the development of pressure in the cylinder during a compression stroke, said air cell structure comprising a casing encircling the cylinder and having port communication with the interior of the cylinder but non-communicating with said reservoir chamber.

3. In combination in a hydraulic shock absorber comprising a cylinder, a piston operable in the cylinder, the piston having a piston rod extending through one portion of the cylinder, means providing a reservoir chamber in communication with said cylinder, hydraulic fluid substantially filling the cylinder, and a cushioning air cell structure concentrically encircling the piston rod and subjected to hydraulic fluid upon the development of pressure in the cylinder during a compression stroke, said air cell structure comprising a substantially rigid casing encircling the shock absorber cylinder and having a flexible air isolating tube therein and a port communicating with the interior of the rigid casing for displacement of hydraulic fluid under pressure into the casing for compressing said tube but non-communicating with said reservoir chamber.

4. In combination in a hydraulic shock absorber including a cylinder and a piston operable in the cylinder and dividing the cylinder into compression stroke and rebound stroke chamber portions, means providing a reservoir chamber in communication with said cylinder, and an annular air cell structure for cushioning the compression stroke of the piston in hydraulic fluid pressure relation to the compression stroke chamber portion of the cylinder, said air cell structure comprising a casing disposed about the cylinder and having ported communication with the interior of the cylinder but non-communicating with said reservoir chamber.

5. In combination in a hydraulic shock absorber including a cylinder and a piston operable in the cylinder and dividing the cylinder into compression stroke and rebound stroke chamber portions, means providing a reservoir chamber in communication with said cylinder, and an annular air cell structure for cushioning the compression stroke of the piston in hydraulic fluid pressure relation to the compression stroke chamber portion of the cylinder, said air cell structure comprising a fully sealed air cell member of flexible material and a casing supporting the same about the exterior of the cylinder non-communicating with the reservoir chamber but communicating with the interior of the cylinder through a fluid port for subjecting said flexible casing to hydraulic fluid under compression stroke pressure.

6. In a direct acting shock absorber including a cylinder and a piston operable in said cylinder in the presence of hydraulic fluid in the cylinder, a cushioning air cell structure of generally ring form and subjected to hydraulic fluid pressure during a compression stroke of the piston in the cylinder, said air cell structure having an air chamber therein within which the air is compressible to afford a limited amount of free travel of the piston during the compression stroke, said air cell structure comprising a substantially rigid casing secured about the cylinder and communicating through a port in the wall of the cylinder with one end of the cylinder but non-communicating with the other end thereof, said casing having a flexible air cell member enclosing the air within said chamber.

7. In a direct acting hydraulic shock absorber including a cylinder and a piston operable in the cylinder and dividing the cylinder into compression stroke and rebound stroke chamber portions, a generally channel-shaped inwardly opening annular casing secured in fluid tight relation about the exterior of the cylinder in the region of the rebound stroke chamber portions and including an annular resilient air cell cushioning structure disposed within the annular casing and exposed to hydraulic fluid pressure that develops in said rebound stroke chamber portion in the operation of the piston but non-exposed to pressure of the compression stroke chamber of the cylinder, and a second generally channel-shaped inwardly opening annular casing secured in tight fluid relation about the exterior of the cylinder in the region of the compression stroke chamber and including a resilient annular air cell cushioning structure carried within said second channel shaped casing and exposed to hydraulic fluid pressure that develops in said compression stroke chamber portion in the operation of the piston but non-exposed to pressure of the rebound stroke chamber of the cylinder.

References Cited in the file of this patent

UNITED STATES PATENTS

| 1,565,770 | Almesan | Dec. 15, 1925 |
| 1,936,788 | Hardy | Nov. 28, 1933 |
| 1,953,128 | Peteler | Apr. 3, 1934 |
| 2,571,279 | Myklestad | Oct. 16, 1951 |
| 2,628,692 | Hufferd | Feb. 17, 1953 |
| 2,668,604 | Chisholm | Feb. 9, 1954 |
| 2,701,714 | Harwood | Feb. 8, 1955 |

FOREIGN PATENTS

| 296,897 | Great Britain | Sept. 13, 1928 |